W. CHURCHILL.
HEADLIGHT FOR VEHICLES.
APPLICATION FILED JULY 14, 1917.
1,338,675.
Patented May 4, 1920.
2 SHEETS—SHEET 2.
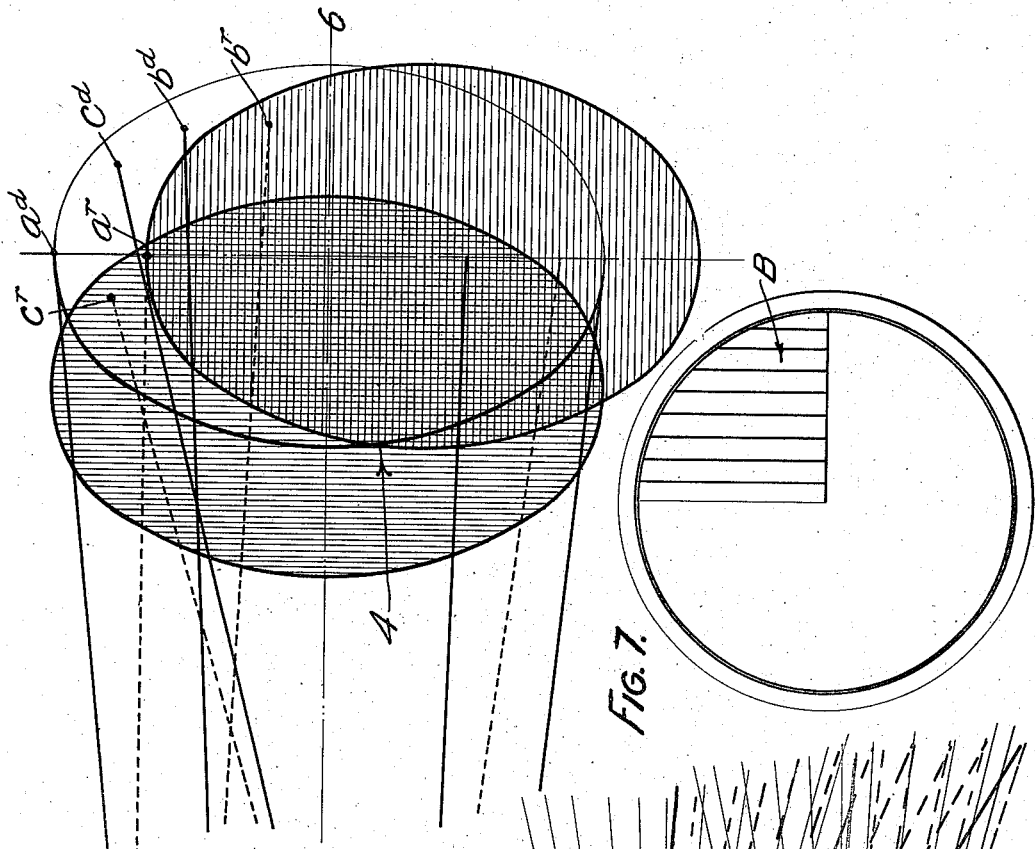
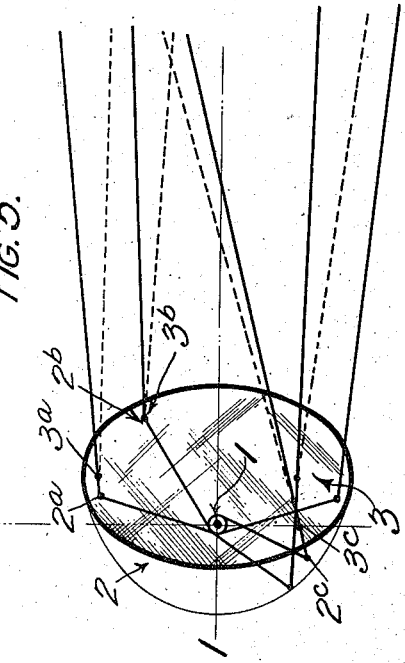
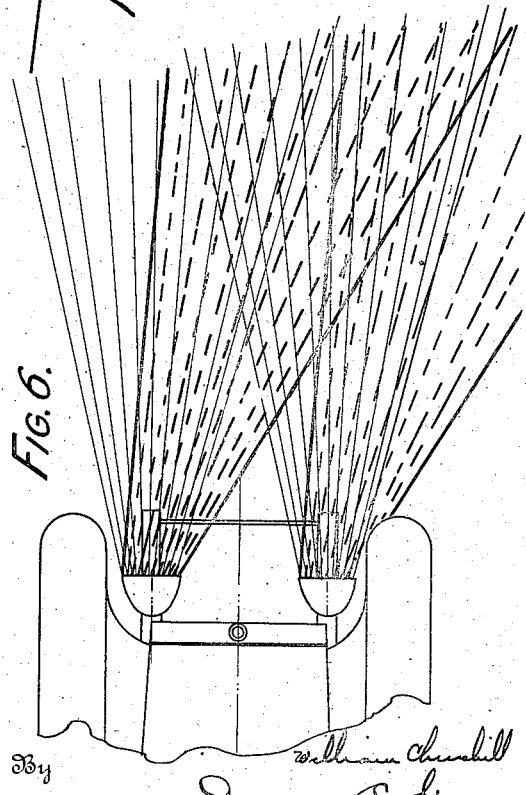

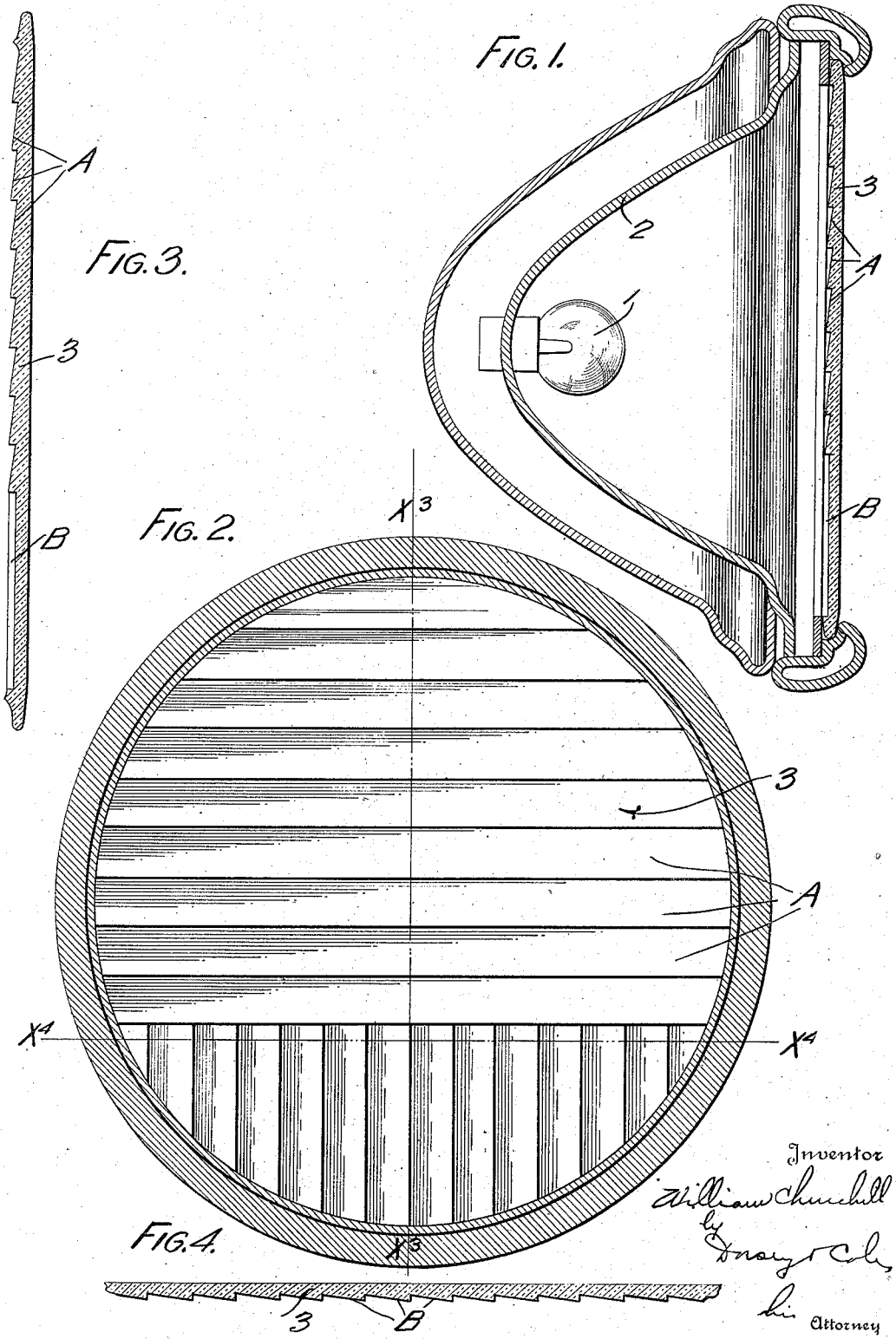

UNITED STATES PATENT OFFICE.

WILLIAM CHURCHILL, OF CORNING, NEW YORK, ASSIGNOR TO CORNING GLASS WORKS, OF CORNING, NEW YORK, A CORPORATION OF NEW YORK.

HEADLIGHT FOR VEHICLES.

1,338,675.     Specification of Letters Patent.     Patented May 4, 1920.

Continuation in part of application Serial No. 142,711, filed January 16, 1917. This application filed July 14, 1917. Serial No. 180,559.

*To all whom it may concern:*

Be it known that I, WILLIAM CHURCHILL, a citizen of the United States of America, and a resident of the city of Corning and State of New York, have invented certain new and useful Improvements in Headlights for Vehicles, of which the following is a specification.

In United States Patent No. 1,193,873, granted to me August 8, 1916, I have shown a cover glass adapted for use in connection with a parabolic reflector and a suitable light source for bending or refracting a beam as a whole, the specific use there suggested being in connection with an automobile headlight whereby the beam will be so modified that no substantial part thereof will be thrown above a plane passing through the headlight and parallel with the roadway, this being accomplished by arranging horizontal prisms on the cover glass.

I now propose to subject the rays projected through different portions of the cover glass to different treatment, so that while a part of such rays are diverted as beams, which do not rise above the plane of the headlights, other rays are projected as a beam above the line parallel with the roadway, but away from the side of the road on which approaching vehicles travel, to avoid blinding the approaching driver, while throwing a sufficient amount of light ahead to permit the observation of distant road conditions and road signs. Thus in the United States where the rule of the road is "Keep to the right," the construction is such that considering the illuminated area formed by a vertical cross-section of a beam projected from the light source and usual reflector, the light, which with such a reflector would be projected in the upper left-hand quadrant of such circle, will be deflected from such quadrant. Light is admitted to the upper right-hand quadrant either to the full intensity of such part of the unmodified beam or in controlled quantities, but in accordance with this invention some light is always admitted to such quadrant and in quantities sufficient for the conditions to be met, and in quantities greater than that admitted to the upper left-hand quadrant.

Obviously for use in countries in which the English rule of the road is observed, the position of the upper illuminated and darkened quadrants will be reversed, but in the following I will describe my invention as constructed for use in the United States, the terms "right" and "left-hand" as applied to the facing of the driver on a car equipped with my invention.

If two headlights are used on the same vehicle, they should, to obtain the results here described, be of similar construction and be counterparts of each other.

Thus, this invention contemplates the substantial suppression of a sector of less than 180 degrees of the illuminated field produced by a headlight of usual construction, and the utilization of the light now used in such sector to illuminate other parts or quadrants of the same field, and for this purpose consists of a novel arrangement and construction of parts as will be hereinafter claimed.

Referring to the accompanying drawings in which corresponding parts are designated by corresponding marks of reference,—

Figure 1 is a section from a headlight embodying this invention;

Fig. 2 is an elevation of the cover glass of the previous figure;

Figs. 3 and 4 are vertical and horizontal sections on lines $x^3$—$x^3$ and $x^4$—$x^4$ respectively of Fig. 2;

Fig. 5 is a perspective view showing the projection of a beam in accordance with this invention;

Fig. 6 is a plan view of the front portion of a car equipped with a pair of headlights embodying my invention, the path of the downwardly projected rays being indicated in full lines and of the laterally projected rays in dotted lines.

Fig. 7 is an elevation of a cover glass embodying my invention, and adapted for use in connection with a light source out of focus.

Referring to Figs. 1 to 4, the light source 1, shown as an electric lamp, is properly located in respect to the reflector 2, preferably of parabolic shape, and a cover glass 3 is arranged in front of the reflector. The cover glass has formed thereon a series of horizontal prisms A whose bases are downward, and a series of vertical prisms B with bases to the right.

The horizontal prisms A deflect the rays projected therethrough by the reflector downwardly, so that none of such rays are projected upwardly at an angle to the principal axis of the reflector, and cause a substantial portion of such rays to strike the roadway within a comparatively short distance in front of the headlight, other rays falling on the roadway at a greater distance, none, or substantially none of such rays rising above the horizontal to the roadway. The vertical prisms deflect the light passing therethrough toward the right, but without downward deflection. By a proper construction of the prisms, light may be thus cut out from the upper left-hand quadrant of what would otherwise be the illuminated area of the headlight. This is graphically shown in Fig. 5 in which the path of the rays as they would be projected by the reflector is represented by the full lines, causing an illuminated field 4, the field more closely approximating a circle the more the source approaches a sphere. In practice, however, the last of these conditions is never present. The size of the illuminated area will depend upon the different dimensions of the light source and its position in respect to the focal point of the reflector, while the shape of the illuminated area will depend on the shape of the light source and its direction in respect to the axis of the reflector. In practice, these conditions are always such that the beam reflected by the reflector is never exactly cylindrical and that at some point in front of the headlight, the illuminated area is much larger than the diameter of the reflector and of the theoretically cylindrical beam projected thereby, and thus a more or less circular field 4 of illumination is produced.

Considering the beams as modified by the prisms, it will be noted that the ray $2^a$—$3^a$—$a^d$ directed toward the top of the field is in its passage through the horizontal prisms A refracted toward the axial line 1—6, and to $a^r$. In the same way the ray $2^b$—$3^b$—$b^d$ projected toward the upper left-hand side of the field 4 is refracted downward to $b^r$. In a similar manner other rays passing through the horizontal prisms on the cover glass are bent downward from the two upper quadrants. The ray $2^c$—$3^c$—$c^d$ reflected from the light emitted from a part of the light source in front of the focal point, and which without the cover glass would be thrown to the upper left-hand quadrant of the field, in passing through a vertical prism B is deflected to the right to $c^r$. In a similar manner all rays which are projected from the reflector in a direction to fall in the left-hand upper section, are, as they pass through the vertical prisms, deflected to the right, causing the illuminated field to assume the form illustrated by shading in Fig. 5.

As shown in Fig. 5, the field of illumination produced by my improved headlight has its lower right-hand portion formed both by the downwardly and by the laterally deflected beams. It is therefore of maximum intensity, as it is desirable to illuminate the side of the road and the ditch adjacent to the vehicles. The left-hand lower portion of the field is illuminated only by the downwardly refracted beams, such illumination being made sufficient for this portion of the field by a proper selection of the area of a cover glass having horizontal prisms thereon. The other portions of the field, viz., those due to the light which is projected without downward deflection to the right, are due only to the rays deflected by the vertical prisms, and in my preferred construction such last-named portions of the field are of less intensity than the lower left-hand portion of such field.

While I have shown a cover glass as having the prisms formed integral therewith, on the inner face thereof, and having the horizontal prisms on its upper part and the vertical prisms on its lower part, the arrangement described may be changed and the proportion of the face of the cover glass covered by the several series of prisms may be varied from that shown to suit desired conditions without affecting that essential feature of my invention, which consists in taking that part of a beam of light which would go to form an upper quadrant of the illuminated field and deflect it to one side to illuminate a corresponding and opposite quadrant. Thus, as a specific example of such a construction, the vertical prisms may be placed on the upper part of the cover glass.

Obviously, moreover, the prisms both vertical and horizontal may be varied among themselves to suit the peculiarities of the light source and the reflector to more perfectly obtain desired results.

The results which we have described can also be secured by the use of a parabolic reflector in which the lamp is set out of focus one way or the other and by covering one quadrant of the opening of the parabola with a cover glass so formed in such quadrant that it will deflect the light which would otherwise be projected to the upper left-hand quadrant of the illuminated field, the other portions of the cover glass being plain if desired.

Assuming that the lamp is inside the focus of the reflector, this result can be secured by using a cover glass, such as is shown in Fig. 7, the upper left quadrant of which is provided with surfaces B which will deflect the light toward the right, for in case of a source inside the focus, light from the upper part of the parabola is projected upward; light from the right-hand side is projected toward the right, etc.

If the lamp is placed in front of the focus of the reflector, light from the lower part of the reflector will illuminate the upper part of the field; light from the right-hand side of the reflector will illuminate the left-hand side of the field. With this arrangement of light source, it will therefore be necessary, to obtain the results described, to provide the lower right-hand portion of the cover glass with refracting surfaces which will deflect the light downward or toward the right, or both.

It will be understood that my invention contemplates the substantial suppression of illumination in a sector of less than 180 degrees of the field, (preferably a quadrant) and the deflection of light which would otherwise fall thereon, to another, and preferably, the opposite upper quadrant.

When used in pairs, as is generally the case with automobile headlights, the glasses forming the pairs should give a lateral deflection in the same direction (that is to say, broadly speaking, similar glasses should be used in pairs) to prevent illumination of both sides of the road above the predetermined level, which as before stated, it is the object of this invention to avoid, while permitting such illumination of one side.

Having thus described my invention, what I claim and desire to secure by Letters Patent is,—

1. In a light projector for a vehicle, the combination with a light source, of a reflector and a cover glass, the cover glass having refracting faces thereon so disposed that the beam projected from the reflector is asymmetrical above the axis thereof.

2. In a light projector for a vehicle, the combination with a light source, of a reflector and a cover glass, the cover glass having refracting faces thereon to bend part of the rays from the reflector downwardly in respect to the axis and to bend part of the rays asymmetrically to one side of the axis without substantial downward bending.

3. A cover glass having on one portion thereof horizontal prisms whose bases are downward for causing a downward divergence of the rays passing through such portion, and having vertical prisms on another portion for causing a divergence of other rays passing through such last-named portion to one side only.

4. A cover glass having thereon refracting faces for producing a downward divergence of the rays, and a lateral divergence of the rays passing therethrough, the refracting faces being so constructed that the field of illumination has the lower portion thereof illuminated both by the lateral and the downwardly deflected rays, and has its upper portion illuminated only by the laterally projected rays.

5. A projecting element for a vehicle, including a cover glass having thereon refracting faces for producing a downward divergence and a lateral divergence of rays passing therethrough, such refracting faces being of such a character that the laterally and downwardly projected rays unite in forming a field of illumination in front of the vehicle below the level of the projecting element and to one side of the axis thereof, the downwardly projected rays individually illuminating a field to one side of such portion of double illumination, and the laterally deflected rays illuminating a field above and to the other side of such portion of double-illumination, the last-named portion of the field being the less illuminated.

6. A pair of cover glasses for a vehicle, the glasses having thereon refracting faces for producing a downward divergence, and a divergence to one and the same side only, of the rays passing therethrough.

In testimony whereof I have signed my name this 23rd day of June 1917.

WILLIAM CHURCHILL.